Aug. 22, 1939.   R. M. HARDGROVE   2,170,350
CONTROL SYSTEM
Original Filed Dec. 18, 1935   3 Sheets—Sheet 1

INVENTOR.
RALPH M. HARDGROVE
BY
Raymond N. Junkins
ATTORNEY.

Aug. 22, 1939.   R. M. HARDGROVE   2,170,350
CONTROL SYSTEM
Original Filed Dec. 18, 1935   3 Sheets-Sheet 2

INVENTOR.
RALPH M. HARDGROVE
BY
ATTORNEY

Aug. 22, 1939.  R. M. HARDGROVE  2,170,350
CONTROL SYSTEM
Original Filed Dec. 18, 1935   3 Sheets—Sheet 3

INVENTOR
RALPH M. HARDGROVE
BY
Raymond W. Junkins
ATTORNEY

Patented Aug. 22, 1939

2,170,350

UNITED STATES PATENT OFFICE 2,170,350

CONTROL SYSTEM

Ralph M. Hardgrove, Westfield, N. J., assignor to The Babcock & Wilcox Company, Newark, N. J., a corporation of New Jersey Application December 18, 1935, Serial No. 55,027
Renewed December 22, 1938

11 Claims. (Cl. 60—106)

This invention relates to control systems, and especially to a method and means useful in operating and controlling the operation of power producing and/or utilizing apparatus. More particularly it utilizes a variable in the operation of a power producing or utilizing apparatus as a measure of the operation and for the control of the same or other apparatus.

I have chosen as a preferred embodiment to illustrate and describe the present invention in connection with or related to the operation of vapor generators; particularly vapor generators of the drumless, forced-flow type, having a fluid flow path including one or more long small-bore tubes, in which the flow in the path is initiated by the entrance of liquid under pressure at one end, and with the exit of vapor only at the other end; characterized by an inflow of liquid normally greater than the outflow of vapor, the difference being diverted from the path intermediate the ends thereof.

Such a vapor generator having small liquid storage and operated with wide range combustion devices forms a combination rendering practical extremely high heat release rates with the consequent ability to economically handle practically instantaneous load changes from minimum to maximum, and vice versa, without heavy standby expense, and is particularly suited for operating conditions such as locomotive service, where load variations are of a wide range and are required to be met substantially instantaneously.

The generator has a minimum liquid storage capacity with a maximum heat absorbing surface, so disposed and arranged as to be substantially instantaneously responsive to rapid changes and wide diversities in heat release rate in the furnace. The heat absorbing surface is arranged in relation to the path of the products of combustion and radiant heating so that the entering liquid is received at the cooler end of the path. Further, the vapor generator insofar as the passage of combustion gases is concerned has a continuously increasing resistance to gas flow throughout the length of the passage.

The heat absorbing surface, or flow path for the working medium, is comprised of one or more long small-bore tubes with an enlargement, preferably at the end of the generator section, which acts as a separator to divide liquid and vapor. The vapor is then passed through a superheater, while the excess liquid carried through the tubes for the purpose of wetness and preventing scale deposit, is diverted out of the separator under regulated conditions, as will be hereinafter set forth. From the separator there is a normal continuous and an additional regulated spillover or diversion of a part of the liquid entering the economizer under pressure, so that there is always being fed to and through the economizer and vapor generating sections more liquid than can be converted into steam in a single passage therethrough, although the proportion of such excess liquid represents but a small part of the total volume of fluid passing through the vapor generator and is at most times only sufficient to insure tube wetness and to carry off scale forming material.

In vapor generators of the character mentioned having small liquid and heat storage with high heat release capabilities, the liquid inflow and heating must of necessity be continuous and at all times proportioned to the demand or output of the unit. Furthermore to accomplish the wide range in heat release with substantial instantaneous response and to perform the combustion process efficiently, a method and means for operating such a vapor generator in accordance with varying conditions must be provided.

A principal feature of the present invention lies in the utilization of a variable in the operation of the unit as a measure of the load upon the vapor generator and for the control of liquid supply and heating to the generator.

I have chosen to illustrate and describe an arrangement wherein substantially all of the vapor generated goes to a main turbine. An auxiliary turbine is utilized to supply liquid and the elements of combustion to the vapor generator, and the regulation of the auxiliary turbine is in part responsive to the pressure of vapor within the shell of the main turbine at a location where such pressure is a measure of the rate of vapor flow to and through the main turbine. Thus, said vapor pressure is a measure of the load upon the vapor generator and correspondingly of the output of the vapor generator.

Further features and objects will become evident from a study of the specification and of the drawings, wherein identical parts bear the same reference numerals, and in which:

Fig. 1 diagrammatically illustrates a drumless forced-flow vapor generator, combined with the requisite apparatus to control the functioning thereof, and such apparatus shown in partially diagrammatic fashion.

Figure 1:
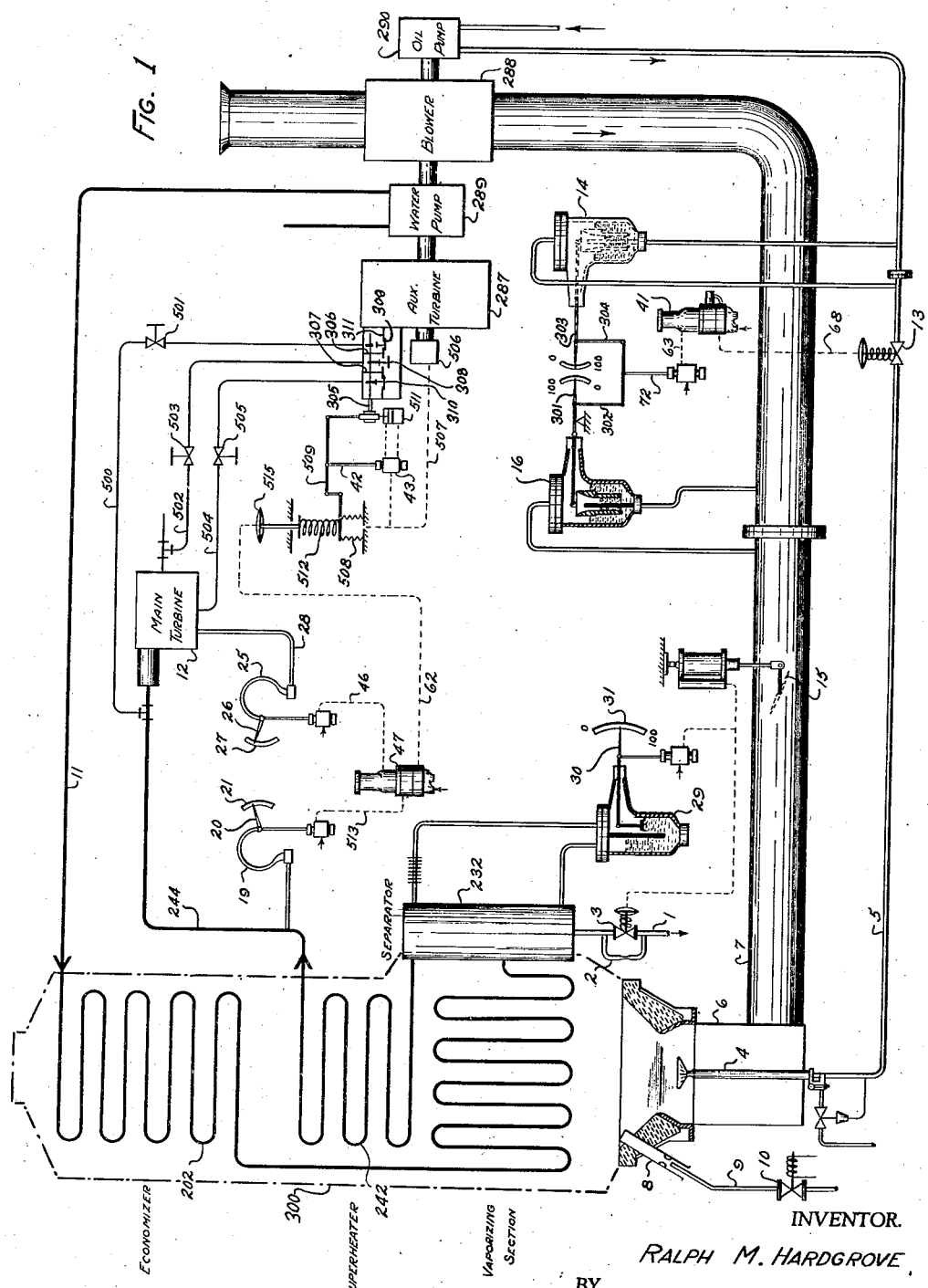

The fluid flow path of the drumless forced-flow vapor generator to which the present invention is directed, is diagrammatically illustrated in Fig. 1 as a single sinous tube, to the economizer section 202 of which, liquid is supplied under pressure through a pipe 11 from a pump 289, which may be of any suitable type and is therefore shown diagrammatically. The liquid leaving the economizer passes through a vaporizing section which might for instance comprise floor, walls, and screen of the combustion space; the fluid then discharging into a separator 232 forming a bulge in the fluid flow path. From the separator, vapor passes to and through the superheater 242 to a main turbine 12 illustrative of a vapor consuming device. The excess liquid entering the separator is diverted from the fluid flow path through a pipe 1 as for instance to the hot-well or to waste. A normal continuous spillover or diversion occurs through the restriction 2, while a variable diversion occurs through the regulating valve 3.

A source of heat is shown as an oil burner 4 supplied by an oil pump 290 through a pipe 5, and surrounded by an air chamber 6 supplied by a blower 288 through a conduit 7. In order to provide for initial ignition of the oil firing means, a gas burning torch 8 is supplied through a pipe 9 with a flow of gas under the control of a valve 10. Products of combustion pass successively through the vaporizing section, superheater, and economizer, and may contact a part or all of the separator. The walls defining the gas passage from the burner to the stack are diagrammatically illustrated at 300 by dot-dash line.

An auxiliary turbine 287 drives the liquid feed pump 289, the air blower 288 and the fuel supply pump 290. While I have illustrated these devices diagrammatically and as though all were located to be driven by the same shaft and at the same speed, it will be understood that the necessary gear reduction or driving connections between the several devices, are known and would be properly designed as to relative speed, power, etc. and that I merely intend to indicate that the auxiliary turbine drives the devices 289, 288, and 290 simultaneously and in unison.

The rate of supply of fuel oil to the burner 4 is primarily controlled by the speed of the oil pump 290, but is further regulated by the throttling of a regulating valve 13 in the pipe 5; the rate of flow being continuously measured by a meter 14.

The rate of supply of air to support combustion is primarily determined by the speed of the blower 288, but is further under the control of a damper 15, positioned in the conduit 7; the rate of supply of air being continuously measured by a meter 16.

In the operation of such a vapor generator certain variables are indicated and utilized as a basis for automatically controlling the supply of fluid thereto, and the supply of the elements of combustion to the heating furnace.

I indicate at 19 a pressure responsive device, such as Bourdon tube, connected to the conduit 244 and having an indicator pointer 20 adapted to cooperate with an index 21 for advising the instantaneous value of the vapor outlet pressure.

Figure 5:
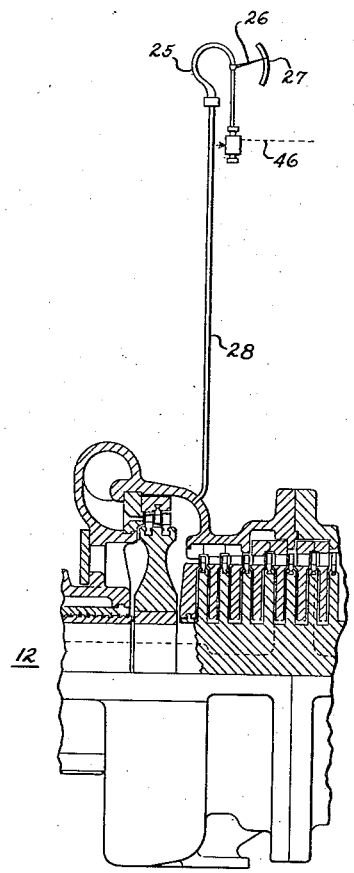
Fig. 5 is a partially sectioned elevation of a fragment of a steam turbine.
Figure 6:
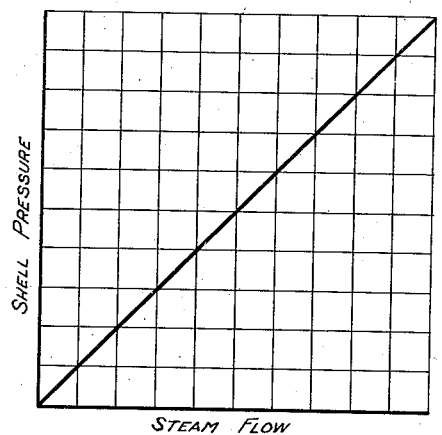
Fig. 6 is a graph of flow-pressure relationship.

As an indicator of output, or load upon the vapor generator, I provide a Bourdon tube 25 adapted to position an indicator pointer 26 relative to an index 27. The Bourdon tube 25 is connected by means of a capillary 28 with the turbine 12 at a location (Fig. 5) such that the Bourdon tube will be sensitive to first stage shell pressure of the turbine, which pressure bears a straight line relation to rate of vapor flow (Fig. 6). Thus the pointer 26 will indicate relative to the scale 27 a reading representative of rate of flow of vapor from the vapor generator and therefore an indication of output or load upon the generator.

At 29 I indicate means responsive to liquid level within the separator 232, and constituting a pressure casing enclosing a mercury U-tube connected across the vertical elevation of the separator. A float is adapted to rise and fall with the surface of the mercury in one leg and to thus cause a positioning of a pointer 30 relative to an index 31 to advise the instantaneous value of liquid level within the separator.

The flow meters indicated in general at 14 and 16 for providing a measure of the rate of supply of fuel and air respectively to the furnace are of a known type, such as disclosed in the patent to Ledoux 1,064,748. Such a meter is a differential pressure responsive device adapted to correct for non-linear relation between differential pressure and rate of flow, to the end that angular positioning of the respective pointer is by increments directly proportional to increments of rate of flow. I illustrate by dotted lines within flow meter 14 the outline of the internal construction wherein is a liquid sealed bell having walls of material thickness and shaped as described and claimed in the above mentioned Ledoux patent. The pressure casing of level meter 29 and of the flow meter 16 are each shown in section to clearly illustrate the internal construction.

The flow meters 14 and 16 cooperate in the control of the regulating valve 13 for the fuel oil so as to maintain predetermined fuel-air relation. An increase in rate of flow of air through the conduit 7 results in a counter-clockwise movement of the indicator arm 301, moving the link 302 upwardly. Correspondingly, an increase in rate of flow of fuel oil through the pipe 5 results in a counter-clockwise movement of the indicator arm 303, moving the link 304 downwardly. Equal movements of the links 302, 304 (in opposite direction) results in no axial movement of the pilot valve stem 72, which is as desired, for the ratio of flows remains unchanged. However, should the rates of flow of air and fuel differ, the differential between the positions and movements of links 302, 304 results in an axial positioning of pilot 72, in direction and amount such as to position the diaphragm actuated regulating valve 13 an amount in proper direction to bring the rate of fuel flow back into desired ratio with the rate of air flow.

I primarily regulate the supply of liquid and of the elements of combustion to the vapor generator through controlling the speed of the auxiliary turbine; and such regulation is accomplished from a measure of vapor pressure leaving the superheater, turbine shell pressure as a measure of vapor flow, and from a measure or indication of auxiliary turbine speed.

The auxiliary turbine may be supplied with high pressure vapor from the vapor generator through a conduit 500 provided with a valve 501. It may receive vapor exhausted from the main turbine through a branch line 502 provided with a valve 503. It may receive and utilize extraction vapor from a stage bleed of the main turbine through a conduit 504 provided with a valve 505. The valve chest of the auxiliary turbine is preferably adapted to normally receive low pressure vapor, such as exhaust or extraction vapor from the main turbine, and only if the supply of such vapor is inadequate as called for by the auxiliary turbine governing mechanism does the admission valve means open the high pressure vapor admission through the conduit 500.

The valve chest of the auxiliary turbine is diagrammatically shown as having a partition 311 containing admission valve seats and cooperating valves 308, 309, 310. The cam shaft 305 positions three cams staggered on the shaft, for operating the valves. Further partitions 306, 307 are provided for segregating the supply of steam from the pipes 500, 502 and 504. Preferably the valve 308 is opened first, thus admitting to the auxiliary turbine steam from the exhaust of the main turbine 12. A further requirement for steam results in the opening of valve 310 to admit extraction steam from the main turbine, while a still further demand for steam will cause an opening of the valve 309 to admit high pressure steam through the pipe 500 from the generator output conduit 244.

It is primarily desirable to vary the speed of the auxiliary turbine in step with the main turbine so as to roughly proportion liquid and the elements of combustion to the vapor generator according to load on the vapor generator; then to individually readjust the supplying of liquid and fuel and air according to variables or characteristics in the operation of the power plant.

If vapor were supplied to the auxiliary turbine at a relatively constant pressure, as from the vapor generator, then the principal duty of the governing mechanism would be to vary the opening of the admission valves in step with the main turbine operation. However when the auxiliary turbine is using extraction or exhaust vapor from the main turbine; if the load on the main turbine falls off then the pressure of the vapor available to the auxiliary turbine falls off more rapidly than the requirements of the auxiliary turbine so far as work is concerned, and it will probably be necessary for the valves to be gradually opened as the load is reduced, and even at a certain low load there will be insufficient vapor from this source, and the high pressure valve would have to be opened to supplement the supply of extraction or exhaust vapor.

The auxiliary turbine admission valves cannot then be directly geared to a function of main turbine operation or vapor generator load unless the vapor supply to the auxiliary turbine is at a relatively constant pressure as from the vapor generator. I do however desire the auxiliary turbine to operate at a speed roughly in step with the main turbine.

To determine the speed of the auxiliary turbine I preferably provide an oil pump 506 driven by and with the auxiliary turbine to produce an oil pressure bearing a known relation to speed. I then utilize this oil pressure in a governing mechanism normally tending to hold the speed of the auxiliary turbine constant regardless of pressure of vapor supplied it. I then load up the oil pressure responsive device according to variations in vapor generator and main turbine operation, thus furnishing the speed requirements that the variable speed governor of the auxiliary turbine must work to.

Oil from the pump 506 passes through a pipe 507 to an expansible metallic bellows 508, adapted to position one end of a floating link 509. The other end of the link 509 is moved by and with a power piston traveling in a cylinder 511 and adapted to move the vapor admission valves 308, 309, 310 to the auxiliary turbine. A pilot stem 42 is suspended from the link 509 intermediate the ends thereof and controls the flow of oil under pressure through a pilot casing 43 to opposite sides of the piston 511.

Figure 2:
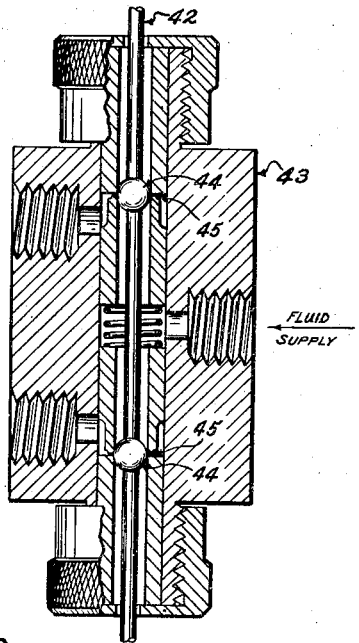
Fig. 2 is a sectional elevation of a pilot valve.

A pilot valve such as that indicated at 43 is shown in detail in Fig. 2, and forms the subject matter of the copending application of Clarence Johnson, Serial No. 673,212 filed May 27, 1933, patented September 15, 1936, Patent No. 2,054,464.

Fluid under pressure is applied to the interior of the casing 43 intermediate the pilot lands 44, which lands are so spaced along the stem 42 as to coincide with narrow annular ports 45. When the pilot stem is axially moved in the casing so that the lands 44 are moved relative to the ports 45, then a definite loading pressure is available in the annular ports bearing a known relation to the amount of such movement. For example, if the stem 42 is moved upwardly there is available at the upper left-hand exit of the casing (Fig. 2) a loading pressure increasing in definite relation to such movement, while if the stem 42 is moved downwardly there is available at the lower left-hand exit a pressure increasing definitely with such movement.

Assuming a fixed loading on the governor spring 512 at the upper end thereof, then if the load on the main turbine decreases, causing a decrease in pressure of vapor available through either 502 or 504, the speed of the auxiliary turbine will decrease causing a decrease in pressure of oil available at the bellows 508 and a lowering of the left-hand end of the link 509 with a corresponding downward movement of the pilot 42. Such movement will decrease the pressure above the piston and increase the pressure below the piston 511 causing the piston to move upwardly and reposition the pilot stem 42 to its predetermined location. Upward movement of piston 511 will open the admission valves and thereby tend to return the speed of the auxiliary turbine to its previous value.

As previously mentioned, I desirably load the governor spring 512 in amount depending upon the rate of operation of the vapor generator and of the main turbine. As an indication of the load on the main turbine I preferably use a measure of the vapor supplied thereto, and as a measure of the heat level of the vapor generator I use an indication of vapor outlet pressure at the exit of the superheater. I have found that turbine shell pressure bears a straight line relation to rate of flow. Preferably I utilize first stage pressure, although the pressure at any other stage might be taken.

Pressure effective upon the Bourdon tube 19 positions a pilot stem to establish an air loading pressure in the pipe 513 representative of the pressure of the vapor in conduit 244. Likewise the Bourdon tube 25 positions a pilot stem to establish an air loading pressure in the pipe 46 representative of the turbine shell pressure. The two loading pressures are effective at a differential relay 47, from which an air loading pressure, an algebraic resultant of the pressures in the pipes 513, 46 is effective through a pipe 62 upon a diaphragm 515 for loading the spring 512.

Figure 3:
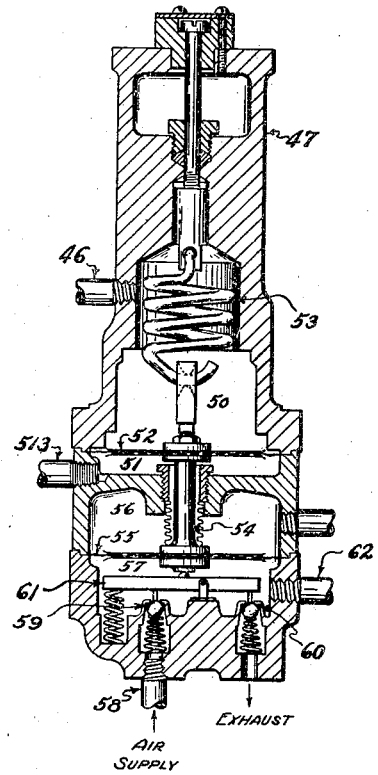
Fig. 3 is a sectional elevation of a pneumatic relay.

Referring to Fig. 3, the connection 46 leads to a chamber 50, separated by a diaphragm or movable partition 52 from a chamber 51 to which is connected the pipe 513. The diaphragm 52 and its loading spring 53 are both connected to a stem 54, to which is also attached a diaphragm 55, separating the chambers 56, 57. Chamber 56 is open to the atmosphere. A supply of air under pressure is available through the connection 58 to the chamber 57 under the control of a valve 59. Exhaust from the chamber 57 to the atmosphere is under the control of a valve 60. The stem 54 is adapted to position a valve actuator 61 to either admit air under pressure through the valve 59, thus increasing the pressure within the chamber 57, or to bleed air to the atmosphere through the valve 60 and thus decrease the pressure within the chamber 57. Pressure within the chamber 57 is transmitted through a connection 62 to be effective upon diaphragm 515. It will be observed that variations in the pressure effective through the connection 46 and/or that effective through the connection 513, will be effective to vary the air pressure within the chamber 57 and correspondingly the air pressure for positioning the diaphragm 515. Certain features of the differential relay 47 are described and claimed in the copending application of Paul S. Dickey, Serial No. 8023, filed in the United States Patent Office February 25, 1935, patened November 9, 1937, Patent No. 2,098,913.

When pressure within the chamber 50 increases, the stem 54 and diaphragms 52, 55 move downwardly against the tension of the spring 53, causing the valve actuator beam 61 to move in a counter-clockwise direction, thus opening valve 59 to admit the pressure fluid (air) to the chamber 57. Pressure within the chamber 57 builds up until a value is reached wherein such pressure, acting upon the diaphragm 55, overcomes the increased pressure in the chamber 50 and causes the stem 54 and diaphragms 52, 55 to move upwardly or return to the predetermined position wherein valves 59, 60 are both closed. The new pressure within the chamber 57, effective through the pipe 62, positions the diaphragm 515 downwardly against the spring 512 and increases thereby the loading on the metallic bellows 508. The reverse action is true wherein a decrease in pressure within the chamber 50 or an increase in pressure within the chamber 51 each results in a clockwise positioning of the valve actuator 61 and results in a lowering of pressure within the chamber 57 and correspondingly a lessening of loading upon the spring 512.

Figures 7, 8:
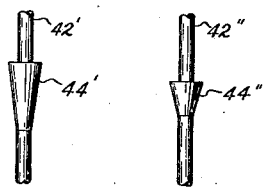
Figs. 7 and 8 are details of pilot valve constructions.

In loading the governor spring 512 I preferably let the effect from turbine shell pressure predominate. This may be done by shaping the pilot land 44' (Fig. 7) positioned from vapor outflow pressure to have a longer and slower slope, thus requiring greater movement per pound air pressure change and correspondingly a lesser change in air loading pressure for a given change in vapor pressure; as compared to the pilot land 44" (Fig. 8) positioned from turbine shell pressure, having a relatively steeper inclination and correspondingly greater change in air loading pressure for a given change in turbine shell pressure. I might accomplish similar results by introducing throttling restrictions in either of the lines 46, 513 to make one effect more sensitive than the other for equal movements of the Bourdon tubes 19, 25.

The apparatus may be adjusted so that full variation from minimum to maximum load may cause sufficient change in air loading pressure to operate the auxiliary turbine over the speed range corresponding to the load variation, or to accomplish desired auxiliary turbine speed variations corresponding to definite vapor outflow pressure variations.

In prior controls for vapor generators, the primary control for liquid inflow and the elements of combustion (in the present case the speed of the auxiliary turbine) has been from outlet pressure as an indication of heat level in the vapor generator. However with the extremely rapid load changes and small heat and liquid storage of the present vapor generator, with the necessity for automatic operation throughout all ranges in rating, it becomes essential that a system such as that just described be used. The ratio control between auxiliary turbine speed (measured by oil pressure) and main turbine shell pressure, is advantageous since approximately the correct change in auxiliary turbine speed is made immediately upon load change instead of waiting until vapor generator pressure changes take place. The sensitivity of the vapor outflow pressure control is reduced and the regulation is smoother with smaller overall variations in vapor pressure than could possibly be the case with only a single element control from the vapor outflow pressure.

Figure 4:
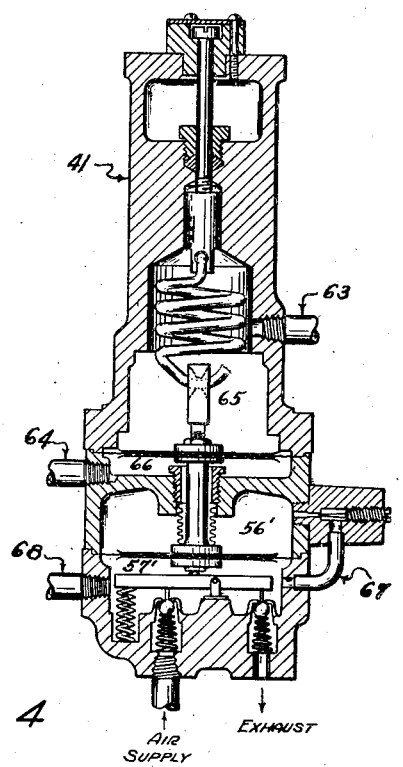
Fig. 4 is similar to Fig. 3, but embodies certain additional features of construction.

Secondary control of the supply of oil to the burner 4 is accomplished from the fuel-air ratio apparatus. The flow meters 14, 16 are interconnected in such a manner that should the rate of supply of fuel oil and the rate of supply of air for combustion to the furnace deviate from the desired ratio, vertical positioning of a pilot 72 occurs for varying a loading pressure effective through the pipe 63 to the chamber 65 of a standardizing relay 41. Referring now to Fig. 4 it will be observed that the standardizing relay 41 is to a certain extent similar to the relay 47, with the addition of a controllable bleed connection 67 between the chambers 56' and 57'. The chamber 66 is open to the atmosphere through the pipe 64.

Certain features of the construction are disclosed and claimed in the co-pending application of Harvard H. Gorrie, Serial No. 8047, filed February 25, 1935, patented November 9, 1937, Patent No. 2,098,914. A loading pressure established within chamber 57' is effective through the connection 68 upon the diaphragm valve 13 for positioning the same. In this instance the function of the controllable bleed connection 67 is to supplement the primary control of the pressure effective upon the actuator 13 with a secondary control of the same or different magnitude as a follow-up or supplement action to prevent overtravel and hunting and wherein the positioning of the valve 13 will not necessarily be directly with the positioning of the pilot stem 72.

A supplemental or secondary control of the air supplied to the furnace through the conduit 7 is accomplished by the positioning in the conduit of the damper 15. This damper, as well as the adjustable valve 3 in the diversion line 1, are positioned together by an air loading pressure established by a pilot valve under the control of the pointer 30 of the liquid level device 29.

The general arrangement of the power plant and the method and apparatus for operation thereof is disclosed and claimed in the co-pending applications of Paul S. Dickey, Serial Nos. 55,022 and 55,023, filed of even date herewith.

What I claim as new, and desire to secure by Letters Patent of the United States, is:

1. In combination, a vapor generator, a main turbine utilizing substantially all the vapor generated by the vapor generator, an auxiliary turbine, means responsive to vapor generator outlet pressure, means responsive to main turbine shell pressure, and means regulating auxiliary turbine speed jointly actuated by said pressure responsive means.

2. In combination, an elastic fluid utilizer, means responsive to fluid pressure supplied the utilizer, means responsive to pressure of the same fluid within the utilizer, apparatus jointly positioned through the agency of both said means, a second elastic fluid utilizer and means controlling the flow of elastic fluid to said utilizer under the control of said apparatus.

3. In combination, an elastic fluid utilizer, means maintaining a fluid pressure proportionate to the pressure of the fluid supplied said utilizer, means maintaining a fluid pressure proportionate to the pressure of the fluid at an intermediate stage of the utilizer, means jointly acted upon by the two proportionate fluid pressures and adapted to maintain a third fluid pressure representative of the combined value and variations of the proportionate fluid pressures, a second elastic fluid utilizer, and means to control the flow of elastic fluid to said last named utilizer actuated by said third fluid pressure.

4. In combination, a main turbine, an auxiliary turbine, means responsive to auxiliary turbine speed, means responsive to main turbine load, and auxiliary turbine speed governing mechanism positioned jointly by said means.

5. In combination, a main turbine, an auxiliary turbine, means responsive to auxiliary turbine speed, means positioned responsive to variations in steam flow through said main turbine, and auxiliary turbine speed governing mechanism positioned jointly by said means.

6. In combination, a vapor generator, a heating furnace therefor, a main turbine utilizing substantially all of the vapor generated by the vapor generator, an auxiliary turbine for operation in step with said main turbine, liquid and fuel and air supplying means for the vapor generator operated in unison by the auxiliary turbine, and speed governing mechanism for the auxiliary turbine jointly responsive to generator outlet pressure, main turbine shell pressure and auxiliary turbine speed.

7. In combination, a vapor generator, a main turbine utilizing substantially all the vapor generated by the vapor generator, an auxiliary turbine, means responsive to vapor generator outlet pressure, means responsive to main turbine shell pressure, and means regulating the flow of vapor to the auxiliary turbine jointly actuated by said pressure responsive means.

8. In combination, a vapor generator, a main turbine utilizing substantially all the vapor generated by the vapor generator, an auxiliary turbine, means for establishing a first fluid pressure corresponding to vapor generator outlet pressure, means for establishing a second fluid pressure corresponding to main turbine shell pressure, means for establishing a third fluid pressure proportional to the algebraic sum of the first and second fluid pressures, and regulating means of the auxiliary turbine speed under the control of the third fluid pressure.

9. In combination, a vapor generator, a main turbine utilizing substantially all the vapor generated by the vapor generator, an auxiliary turbine, means for establishing a first fluid pressure corresponding to vapor generator outlet pressure, means for establishing a second fluid pressure corresponding to main turbine shell pressure, means for establishing a third fluid pressure proportional to the algebraic sum of the first and second fluid pressures, and regulating means of the rate of flow of vapor to the auxiliary turbine under the control of the third fluid pressure.

10. In combination, a vapor generator, a main turbine utilizing substantially all the vapor generated by the vapor generator, an auxiliary turbine, means for establishing a first fluid pressure corresponding to vapor generator outlet pressure, means for establishing a second fluid pressure corresponding to main turbine shell pressure, means for establishing a third fluid pressure proportional to auxiliary turbine speed, and means for controlling the rate of flow of vapor to the auxiliary turbine under the joint control of all of said fluid pressures.

11. In combination, a vapor generator, a main turbine utilizing substantially all the vapor generated by the vapor generator, an auxiliary turbine, means for establishing a first fluid pressure corresponding to vapor generator outlet pressure, means for establishing a second fluid pressure corresponding to main turbine shell pressure, means for establishing a third fluid pressure proportional to auxiliary turbine speed, and means for controlling the speed of the auxiliary turbine under the joint control of all of said fluid pressures.

RALPH M. HARDGROVE.